United States Patent
Baker

(10) Patent No.: US 8,653,684 B2
(45) Date of Patent: Feb. 18, 2014

(54) FACILITY FOR PRODUCING ELECTRICAL ENERGY FROM WIND

(76) Inventor: Brookes H. Baker, Fort Worth, TX (US)

( * ) Notice: Subject to any disclaimer, the term of this patent is extended or adjusted under 35 U.S.C. 154(b) by 327 days.

(21) Appl. No.: 13/161,471

(22) Filed: Jun. 15, 2011

(65) Prior Publication Data
US 2011/0304142 A1    Dec. 15, 2011

Related U.S. Application Data

(60) Provisional application No. 61/397,665, filed on Jun. 15, 2010.

(51) Int. Cl.
F03D 9/00    (2006.01)
H02P 9/04    (2006.01)

(52) U.S. Cl.
USPC .......................................................... 290/44

(58) Field of Classification Search
USPC ..................................... 290/44, 55
See application file for complete search history.

(56) References Cited

U.S. PATENT DOCUMENTS

| | | | |
|---|---|---|---|
| 2,374,889 A | 5/1945 | Ording et al. | |
| 2,751,672 A | 6/1956 | Reed | |
| 4,140,433 A | 2/1979 | Eckel | |
| 4,274,010 A | 6/1981 | Lawson-Tancred | |
| 4,323,331 A | 4/1982 | Schachle et al. | |
| 4,498,017 A | 2/1985 | Parkins | |
| 4,585,950 A | 4/1986 | Lund | |
| 5,495,128 A | 2/1996 | Brammeier | |
| 5,520,505 A | 5/1996 | Weisbrich | |
| 7,095,129 B2 | 8/2006 | Moroz | |
| 7,183,664 B2 | 2/2007 | McClintic | |
| 7,293,960 B2 * | 11/2007 | Yamamoto et al. | ............. 416/85 |
| 7,932,620 B2 | 4/2011 | Plant | |
| 2001/0050299 A1 | 12/2001 | Coleman et al. | |
| 2005/0019163 A1 | 1/2005 | Heronemus | |
| 2008/0124217 A1 | 5/2008 | Friesth | |
| 2008/0129050 A1 | 6/2008 | Guey et al. | |
| 2008/0296897 A1 | 12/2008 | Kovach et al. | |
| 2009/0008939 A1 | 1/2009 | Pare | |
| 2009/0218823 A1 | 9/2009 | Wu et al. | |
| 2009/0322085 A1 | 12/2009 | Renaud | |
| 2010/0031589 A1 | 2/2010 | Fernald | |
| 2010/0090473 A1 | 4/2010 | Glass | |
| 2010/0119370 A1 | 5/2010 | Myhr | |
| 2010/0296928 A1 | 11/2010 | Falcone et al. | |
| 2011/0076146 A1 | 3/2011 | Falcone et al. | |
| 2011/0302879 A1 * | 12/2011 | Baker | ........................ 52/745.17 |

FOREIGN PATENT DOCUMENTS

EP    1363019    11/2003
JP    2001050149    2/2001

(Continued)

Primary Examiner — Javaid Nasri
(74) Attorney, Agent, or Firm — Eric Karich

(57) ABSTRACT

A facility for producing electrical energy has a plurality of shrouds, a plurality of wind turbines, a power system, a plurality of modules, a pivotal mounting system, and a support structure. Each shroud has a throat which increases the velocity of the prevailing wind passing through the shroud. The plurality of wind turbines are each operably positioned in the throat of one of the plurality of shrouds. The power system is adapted for converting mechanical energy from the plurality of wind turbines to electrical energy. The support tower includes a central tower for supporting the shrouds and wind turbines above the surface, and may further include peripheral towers, guys, and/or other structural components.

17 Claims, 15 Drawing Sheets

(56) References Cited

FOREIGN PATENT DOCUMENTS

| | | |
|---|---|---|
| JP | 2001186740 | 7/2001 |
| WO | WO9800639 | 1/1998 |
| WO | WO2008086608 | 7/2008 |
| WO | WO2009107132 | 9/2009 |

* cited by examiner

FACILITY FOR PRODUCING ELECTRICAL ENERGY FROM WIND

CROSS-REFERENCE TO RELATED APPLICATIONS

This application for a utility patent claims the benefit of U.S. Provisional Application No. 61/397,665, filed Jun. 15, 2010.

STATEMENT REGARDING FEDERALLY SPONSORED RESEARCH

Not Applicable

BACKGROUND OF THE INVENTION

1. Field of the Invention

This invention relates generally to power generation devices, and more particularly to a wind power generation facility.

2. Description of Related Art

The prior art teaches the use of a shroud to increase the velocity of a prevailing wind in a throat of the shroud, to increase the ability of a turbine to capture energy from the wind. However, prior art shrouds do not teach a shroud that is shaped to both increase the mass of wind passing through the shroud, and also minimize the drag on the shroud.

Yamamoto, U.S. Pat. No. 7,293,960, for example, teaches a floating wind generating facility that includes hexagonal shaped shrouds. The shape of the shrouds, and in particular the outer surfaces of the shrouds, has a shape that will create considerable drag.

Friesth, U.S. 2008/012417, teaches a shroud that includes a planar face and non-aerodynamically shaped planer outer surface that together create substantial drag.

The facility taught in the present disclosure also includes a tower construction that may be extremely tall. In such a tall structure, it is important to minimize drag to prevent the tower from failing in extreme winds.

The prior art does team some substantial towers to optimize the capture of energy from the wind over a small square footage of foundation. Friesth teaches a tower construction that includes a core tower and a plurality of guys for providing lateral and torsional stability. Another example of a similar tower construction is shown in Weisbrich, U.S. Pat. No. 5,520,505.

The above-described references are hereby incorporated by reference in full.

SUMMARY OF THE INVENTION

The present invention teaches certain benefits in construction and use which give rise to the objectives described below.

The present invention provides a facility for producing electrical energy from a prevailing wind. The facility includes a plurality of shrouds, a plurality of wind turbines, a power system, a plurality of modules, a pivotal mounting system, and a support structure. Each shroud has a throat which increases the velocity of the prevailing wind passing through the shroud. The plurality of wind turbines are each operably positioned in the throat of one of the plurality of shrouds. The power system is adapted for converting mechanical energy from the plurality of wind turbines to electrical energy.

A primary objective of the present invention is to provide a facility having advantages not taught by the prior art.

Another objective is to provide a facility that increases power production at the turbine shaft by a factor of approximately 3.3 over the production of the same size wind turbines not equipped with shrouds at the same wind speeds.

Another objective is to provide a facility that is able to produce power at wind speeds approximately two-thirds as great as the minimum speeds required to produce power by the same size turbines without shrouds, and the consequent ability to feasibly produce power in many geographical areas with normal wind speeds lower than required for conventional wind turbines.

Another objective is to provide a facility that is able, by virtue of the new geographical areas available for wind power, to provide power at or near the points of demand and reduction or elimination of the need for providing additional power transmission facilities for added power production. This location also reduces power losses due to transmission over long distances, thus reducing the cost of power to the user.

Another objective is to provide a facility that improves power production efficiency by routing the output from turbines to a battery of generators of different sizes that can operate in different ranges of optimum efficiency over a wider range of wind velocities.

Another objective is to provide a facility that is able to further improve power production efficiency by combining the flow of hydraulic fluid from the two pumps in a module to one set of controls, motors and generators.

Another objective is to provide a facility that includes a tower support structure that greatly reduce the amount of land required for wind power production relative to conventional wind power generation facilities. This construction also allows utilization or greater wind velocities at higher elevations relative to conventional wind power generation facilities.

A further objective is to provide a facility that can be scaled, larger or smaller, to meet a variety of needs.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a facility for producing electrical energy from a prevailing wind above a surface.

Figure 1B:
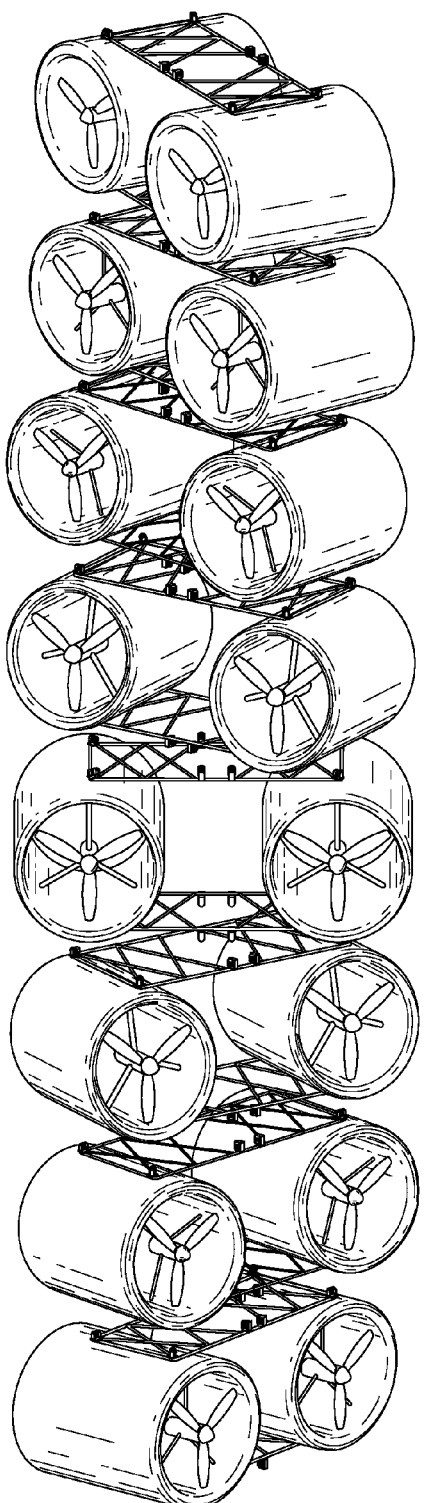
FIG. 1B is a perspective view of the multiple modules with the support structure removed.
Figure 1A:
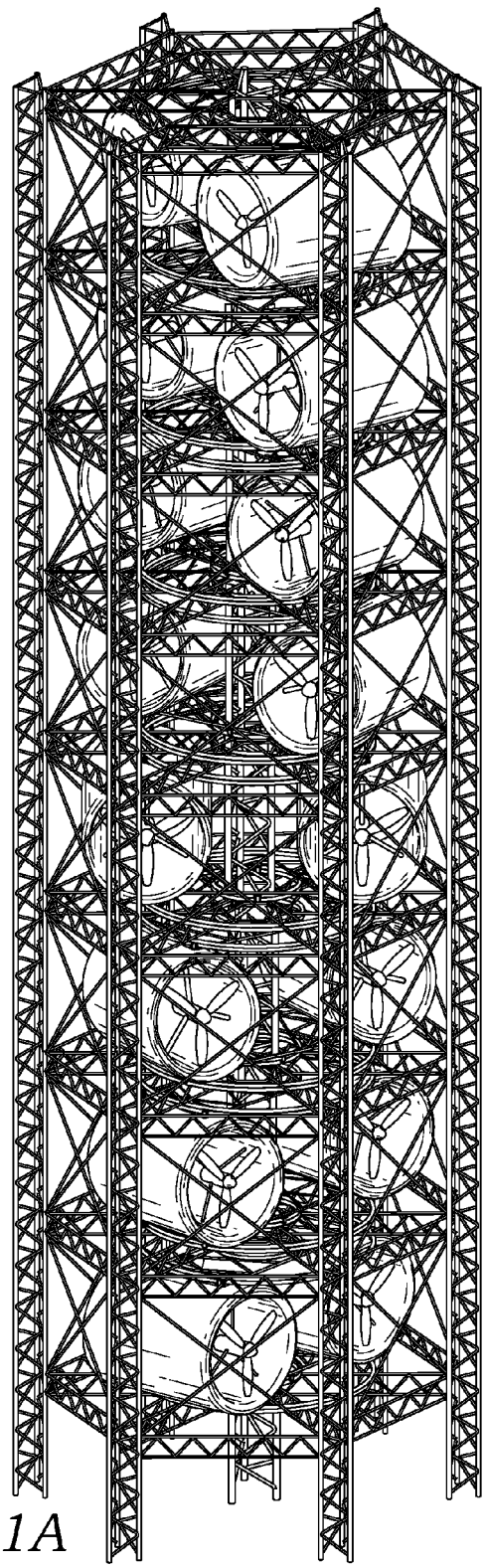
FIG. 1A is a perspective view of a facility illustrating a support structure and multiple modules, according to one embodiment of the present invention.

FIG. 1A is a perspective view of one embodiment of the facility. FIG. 1B is a perspective view of the facility of FIG. 1A, with a support structure removed to better illustrate multiple modules of the facility. The embodiment, singly or in multiple installations, is most efficient in meeting large power demands where construction sites are at a premium.

As illustrated in FIGS. 1A and 1B, the facility includes a power system, a plurality of shrouds, a plurality of wind turbines, a plurality of modules, a pivotal mounting system, and a support structure. The support structure supports a large number of the wind turbines far above the surface (e.g., ground, water, or other location) to both maximize the amount of wind captured, and also to minimize the footprint of the facility.

Figure 2:
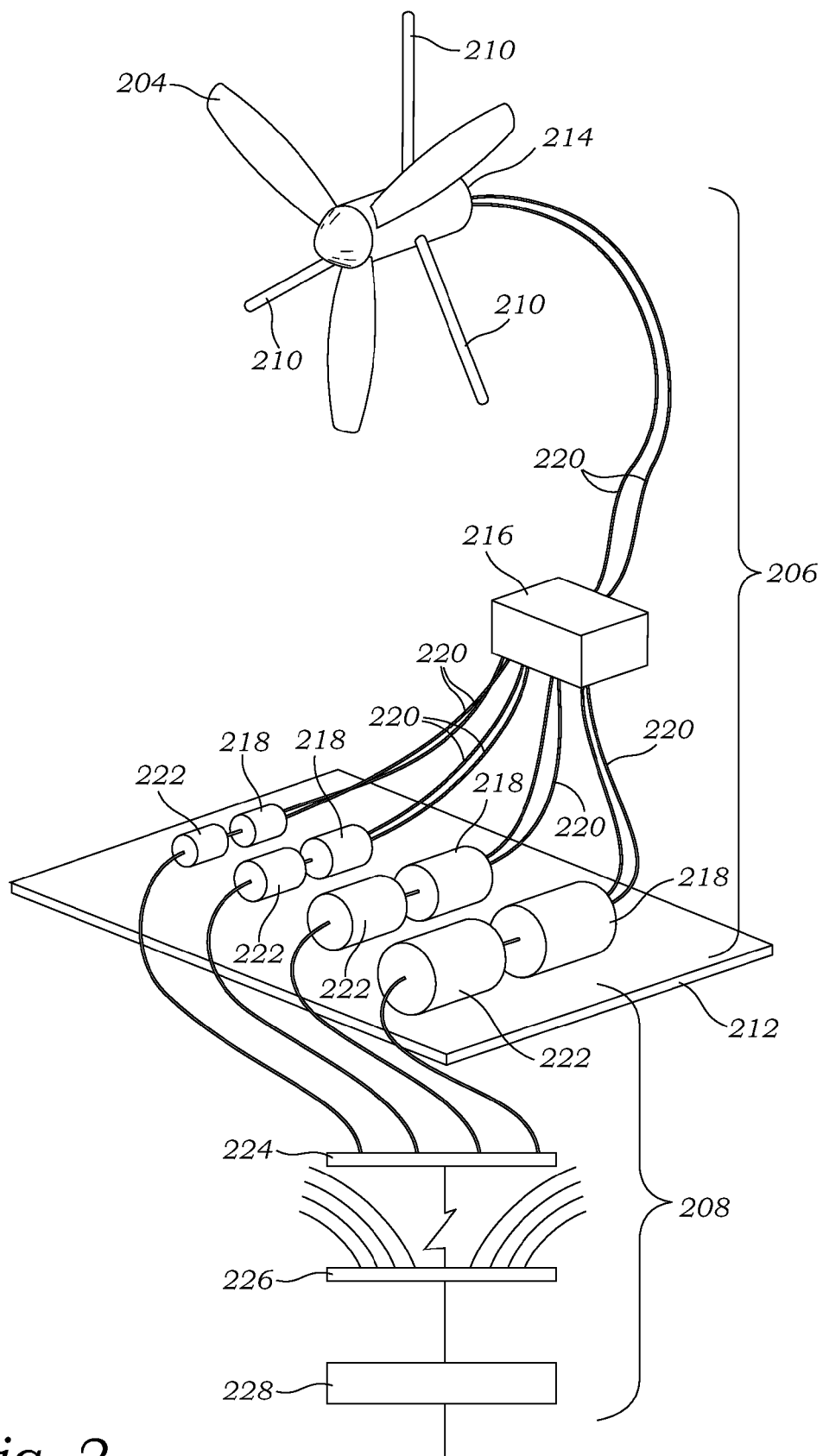
FIG. 2 is a schematic view of a power system of the facility.

FIG. 2 shows a schematic view of one embodiment of the power system. The power system of FIG. 2 includes a wind turbine 204, a hydraulic system 206, an electrical generation system 208, struts 210, and a platform 212. The hydraulic system 206 may include a pump 214, a control system 216, motors 218, plus lines and other components 220. The hydraulic system 206 converts mechanical energy from the turbine 204, via the pump 214, to energy in the form of fluid flow. Fluid flow is then distributed to the appropriate hydraulic motors 218 by the controller 216. The hydraulic motors 218 then convert the fluid flow to mechanical energy which is transmitted to the generators 222.

The control system 216 of the power system includes distribution elements (e.g., valves) for distributing fluid flow from the pump to different size motors 218 and a logic to optimize the production of power. The control system 216 can also accept flows from a plurality of pumps 214 in the modules, illustrated in FIG. 4.

The turbine 204, the pump 214, and a portion of the lines and other components 220 are supported by the struts 210. The struts 210 are in turn supported by the shroud illustrated in FIG. 3A. The control system 216, motors 218, a portion of the electrical generation system 208, and a portion of the hydraulic lines and other components 220 are supported by the shroud, as discussed in greater detail below. While one embodiment of the power system is illustrated, alternative power systems known in the art (e.g., mechanical gearing, and other alternatives) may also be utilized, and such alternative embodiments should be considered within the scope of the present invention.

Figure 3A:
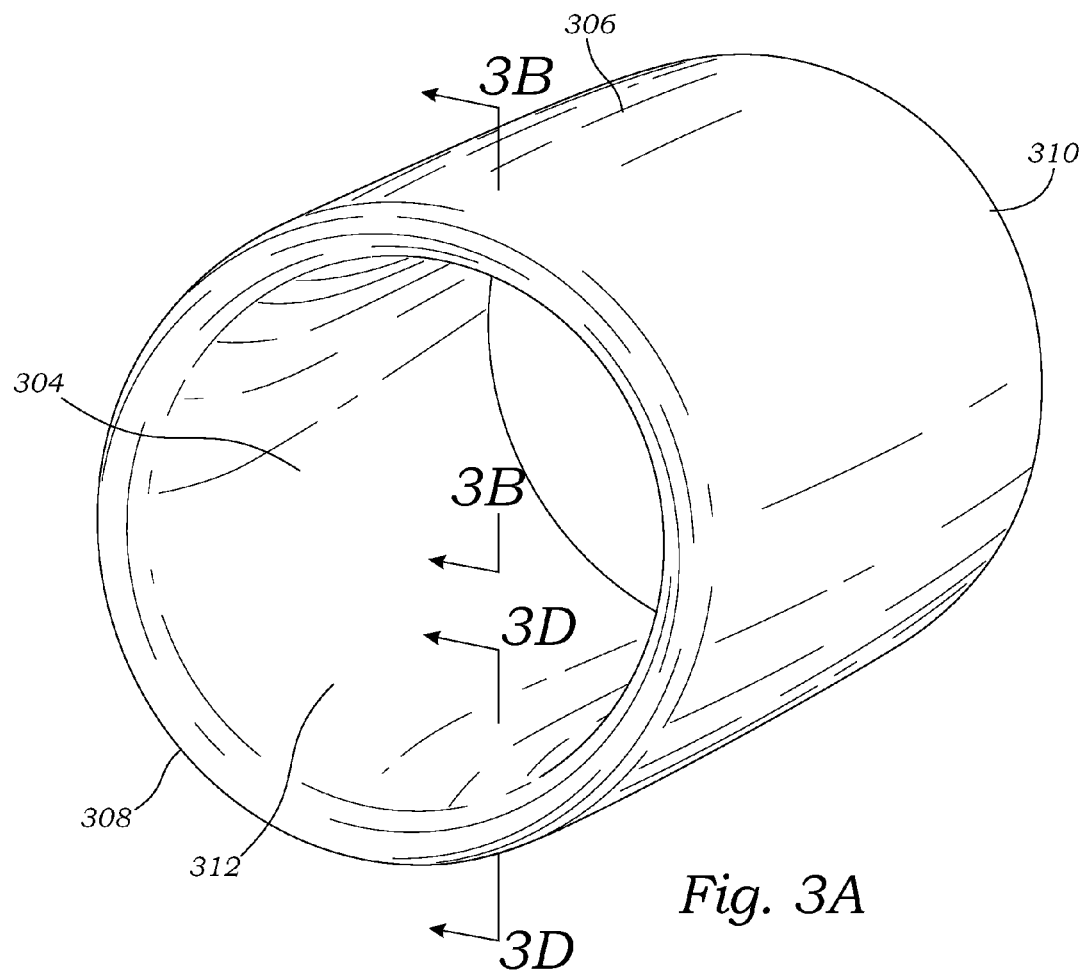
FIG. 3A is a perspective view of a shroud of the facility.

FIG. 3A shows one embodiment of one of the plurality of shrouds. As illustrated in FIG. 3A, the shroud is an aerodynamic hollow shell located around the wind turbine 204, as illustrated in FIG. 1A. The shroud of FIG. 3A may be a specially shaped toroid with a horizontal axis 324, an inner surface 304, and an outer surface 306. The shroud also has a front 308 and a rear 310. This front and rear orientation also applies to all components of the modules, illustrated in FIG. 4. Wind approaches the shroud from the front 308 and leaves the rear 310. The minimum diameter D of the inner surface 304 is the throat 312. The dimensions of the shroud and many other dimensions of the Wind Power System are proportional to the diameter D of the throat 312. As illustrated in FIG. 1A, the turbine 204 is located at the throat 312.

Figure 3B:
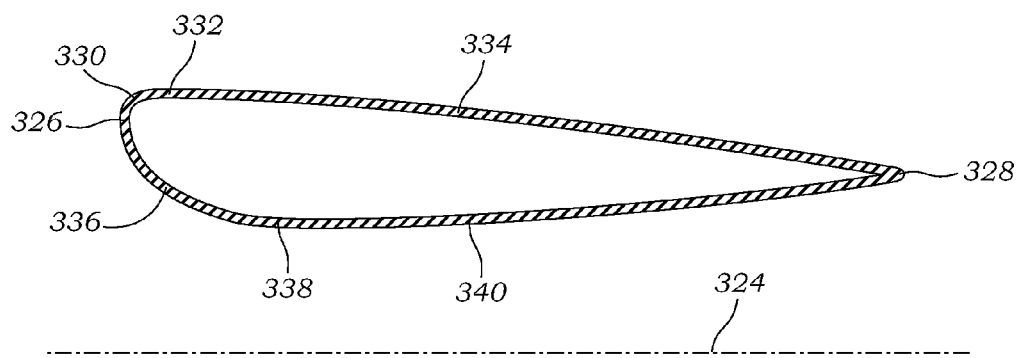
FIG. 3B is a sectional view of the shroud taken along line 3B-3B in FIG. 3A.

FIG. 3B illustrates a section from FIG. 3A shroud. The shroud of FIGS. 2A and 2B is a hollow shell of revolution, or toroid, formed by the path of FIG. 3B shape rotated a full circle of 360 degrees around the horizontal axis 324. FIG. 3B shape includes points 326, 328, 332, and 338, plus lines 330, 334, 336, and 340. The front 308 of the FIG. 3A shroud is more specifically defined as the circle generated by point 326 when FIG. 3B shape is rotated. Point 326 is located a distance of 0.7 D from the axis 324, but may be located in the range of 0.55 D to 0.95 D from axis 324. The rear 310 of the FIG. 3A shroud is more specifically defined as the circle generated by a point 328 when FIG. 3B shape is rotated. Point 328 is a horizontal distance of 1.5 D to the rear of the vertical plane containing point 326, but may be located in the range of 0.5 D to 2.5 D to the rear of point 326.

As illustrated in FIG. 3B, the outer surface 306 of the shroud of this embodiment includes an outer front curve 330 that begins at point 326 going away from and perpendicular to axis 324. The direction of curve 330 may vary as much as fifteen degrees to the rear of perpendicular to axis 324. Curve 330 terminates going parallel to and a distance of 0.75 D from axis 324 at point 332. The direction of curve 330 at its termination may vary as much as ten degrees away from parallel to axis 324. The distance of point 332 from axis 324 may vary from 0.6 D to 2 D. Point 332 is a horizontal distance of 0.075 D to the rear from point 326. Point 332 may vary from 0.05 D to 1.5 D to the rear from point 326. Curve 330 is a quadrant of an ellipse in the first embodiment, but may take any shape. The outer rear line 334 in FIG. 3B shape begins at point 332 and terminates at point 328. Line 334 varies in slope relative to axis 324 in the first embodiment. The minimum slope of line 334 is 4 degrees toward axis 324 at point 332 and the maximum slope is 6.5 degrees toward axis 324 at point 328. The slope of line 334 may vary from parallel to axis 324 to fifteen degrees toward axis 324.

As illustrated in FIG. 3B, the inner surface 304 includes an inner front curve 336 that begins at point 326 going toward and perpendicular to axis 324. The direction of curve 336 at its origin may vary as much as fifteen degrees to the rear of perpendicular to axis 324. Curve 336 terminates going parallel to and a distance of 0.5 D from axis 324 at point 338. The direction of curve 336 at its termination may vary as much as ten degrees away from parallel to axis 324. In the present embodiment, point 338 is a horizontal distance of 0.3 D to the rear from point 326. In alternative embodiments, point 338 may vary from 0.1 D to 1.5 D to the rear from point 326. Curve 336 is a quadrant of an ellipse in the first embodiment, but may be alternative shapes in different embodiments. The path of point 338, when rotated about the axis, forms the throat 312 of the shroud. The inner rear line 340 in the FIG. 3B shape begins at point 338 and terminates at point 328. Line 340 varies in slope relative to axis 324. The minimum slope of line 340 is 4 degrees away from axis 324 at point 338. The maximum slope of line 320 is 6.5 degrees away from axis 324 at point 328. The slope of line 340 may vary from zero degrees to fifteen degrees away from axis 324.

Shroud construction for this embodiment includes several additional provisions as follows: It provides for structural connection to the frame beams 502 and 522. It provides structural support for the struts 210 and the platform 212. It provides interior bracing, illustrated in FIG. 3E, as needed for structural stability and to facilitate assembly. In this embodiment, the shroud may be constructed to also include ingress (e.g., a door) to the interior of the shell. In this manner, the shroud may provide an interior work area as needed for maintenance of the power system. The interior work area may provide egress to service the turbine 204, and it may further provide interior lighting and a ventilation system for use when the interior is in use by maintenance personnel.

Figure 3C:
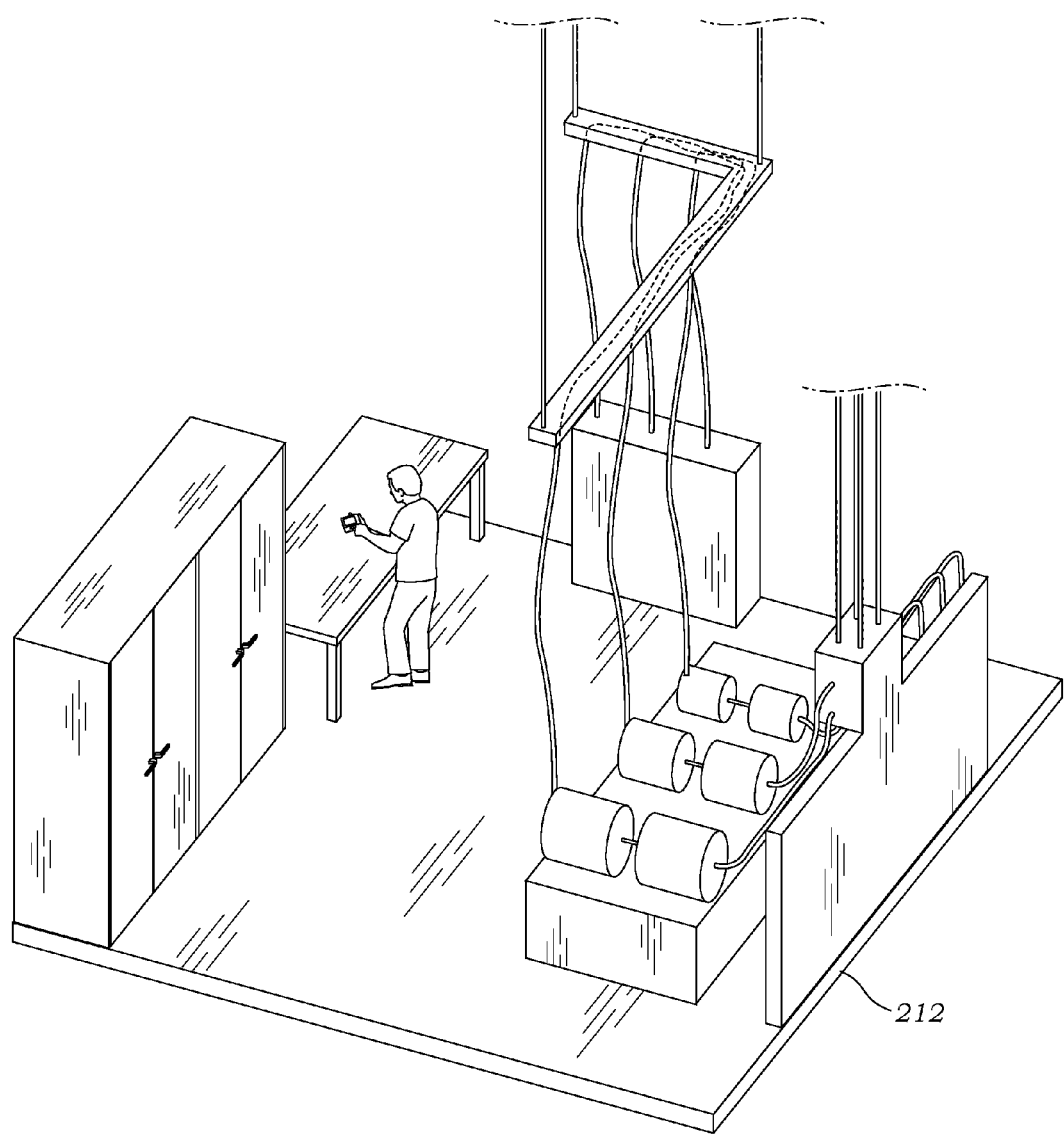
FIG. 3C is a perspective view of a platform of the facility.
Figure 3D:
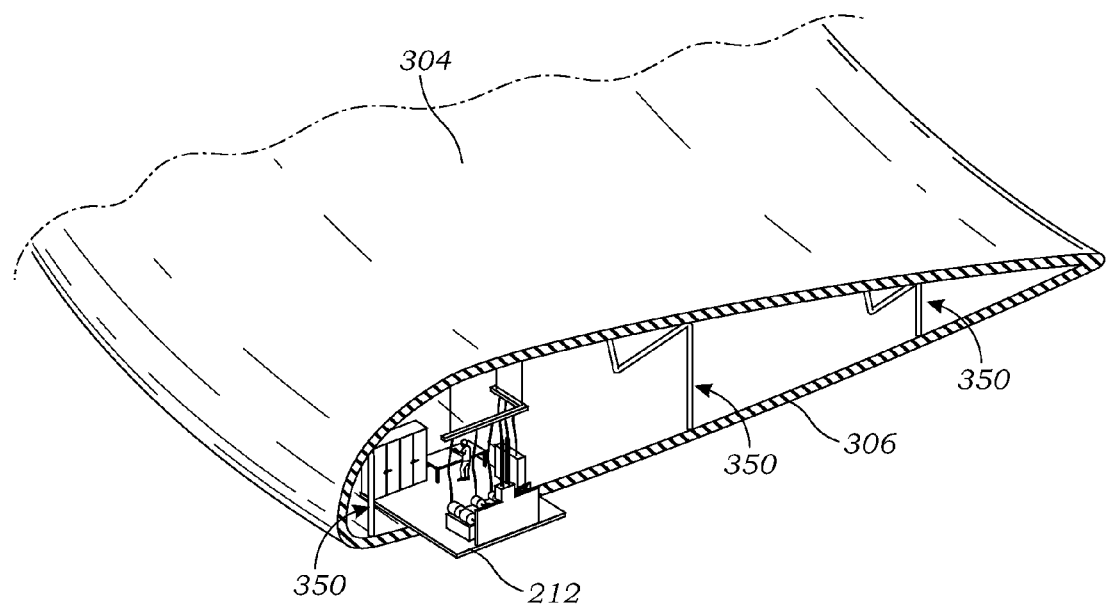
FIG. 3D is a perspective cutaway of the shroud showing the platform of FIG. 3C positioned within the shroud of FIG. 3, and also illustrating internal supports in the shroud.

FIG. 3C is a perspective view of one embodiment of the platform 212 of the facility. FIG. 3D is a perspective cutaway of the shroud showing the platform of FIG. 3C positioned within the shroud of FIG. 3A. In the embodiment of FIGS. 3C and 3D, the platform 212 is positioned within the shroud and contains the control system 216, motors 218, a portion of the electrical generation system 208, and a portion of the hydraulic lines and other components 220. In this embodiment, the shroud serves the added purpose of containing and protecting the platform 212 and the above-mentioned components, and providing a safe location for maintenance workers to work on these components.

While the platform 212 may be internal to the shroud, it may also be located elsewhere if desired, or if the shroud is not big enough to accommodate it. The electrical generation system 208 includes direct current generators 222 increasing in size from small to large, module busses 224, a common direct current buss 226 and an optional alternating current electrical converter 228. The generators 222 and module busses 224 for each FIG. 4 module are located on the platform 212 for that FIG. 4 module. The common direct current buss 226 and optional alternating current converter 228 may be located at a base of the facility of FIG. 1A. The power system of FIG. 2 may produce direct current electricity, or alternating current electricity compatible to a power grid.

Figure 3E:
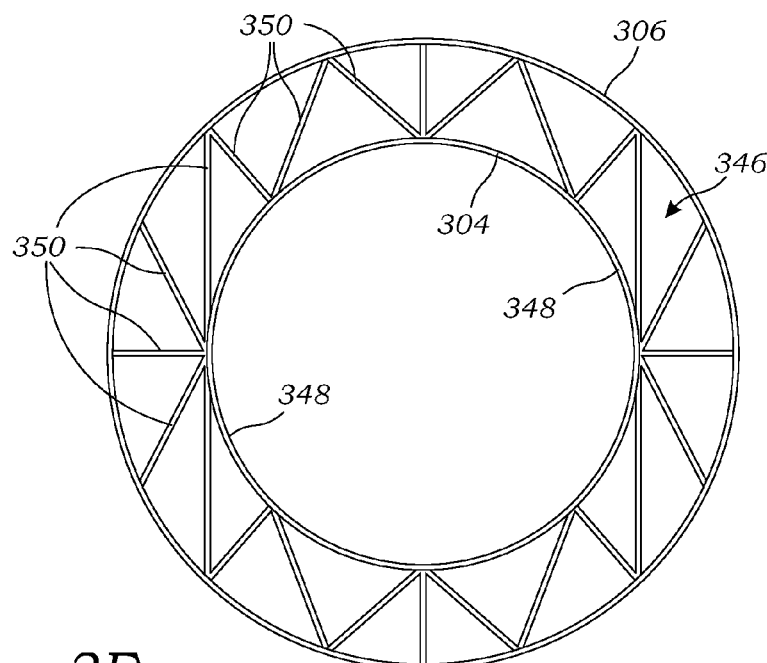
FIG. 3E is a front elevation sectional view of the shroud interior structure system.

FIG. 3E is a front elevation sectional view of the shroud interior structure system 346. The shroud interior structure system 346 includes internal supports 350 between the inner surface 304 and the outer surface 306. While one arrangement of internal supports 350 is illustrated, alternative structures and arrangements may also be used, and such alternatives known in the art should be considered within the scope of the present invention.

Figure 4:
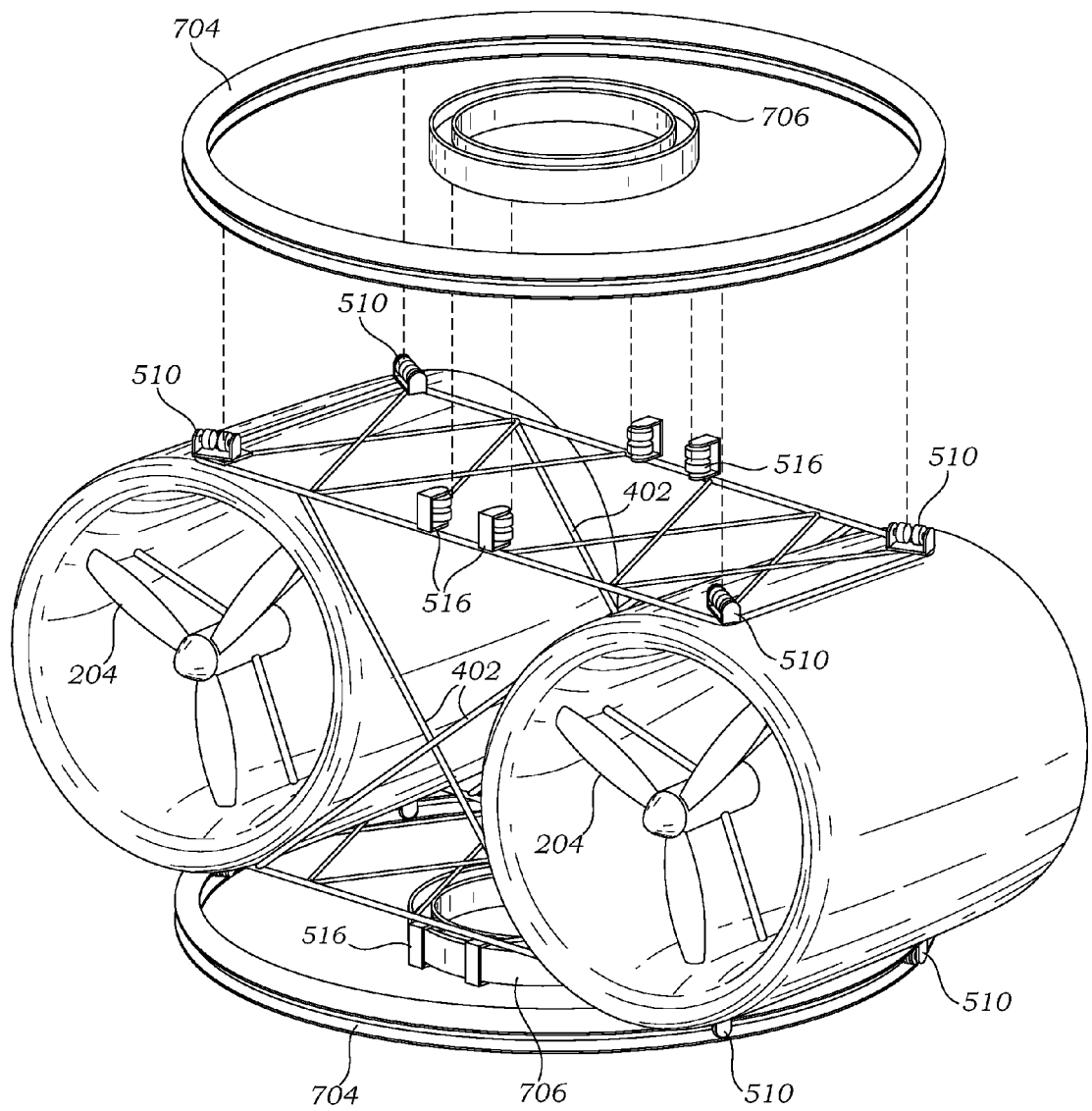
FIG. 4 is an exploded perspective view of the module and rails upon which the module is rotatably mounted.

FIG. 4 is an exploded perspective view of the module of FIG. 1A, and rails upon which the module is rotatably mounted. In the embodiment of FIG. 4, each module includes two shrouds (illustrated in FIG. 3A), and portions of the power system (illustrated in FIG. 2) located in the shrouds. In alternative embodiments, each module may include more than two shrouds, and the shrouds may be disposed in different arrangements (e.g., a pair of shrouds on either side, either side by side or stacked, or alternative numbers and arrangements of shrouds). Such alternatives should be considered within the scope of the present invention.

As illustrated in FIG. 4, each module may further include frames for connecting the shrouds. In the embodiment of FIG. 4, the frame may include an upper frame (illustrated in FIG. 5A), and a lower frame (illustrated in FIG. 5C). The upper frame of illustrated in FIG. 5A and the lower frame of FIG. 5C hold the shrouds in position and support them on opposite sides of the core tower, as illustrated in FIG. 1A.

Figure 5B:
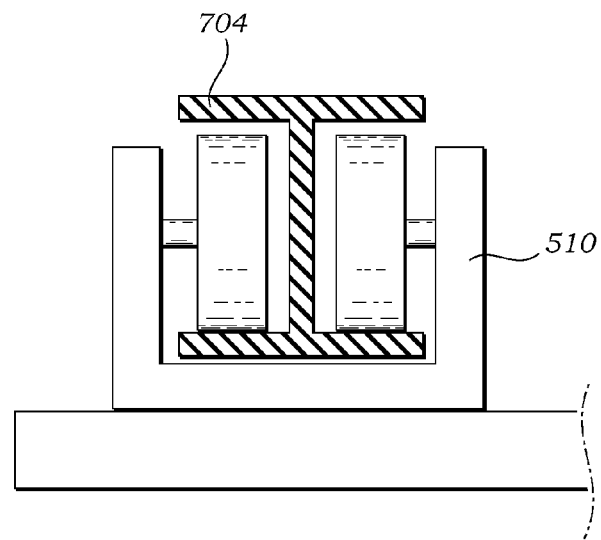
FIG. 5B is a detail of the outer truck.
Figure 5A:
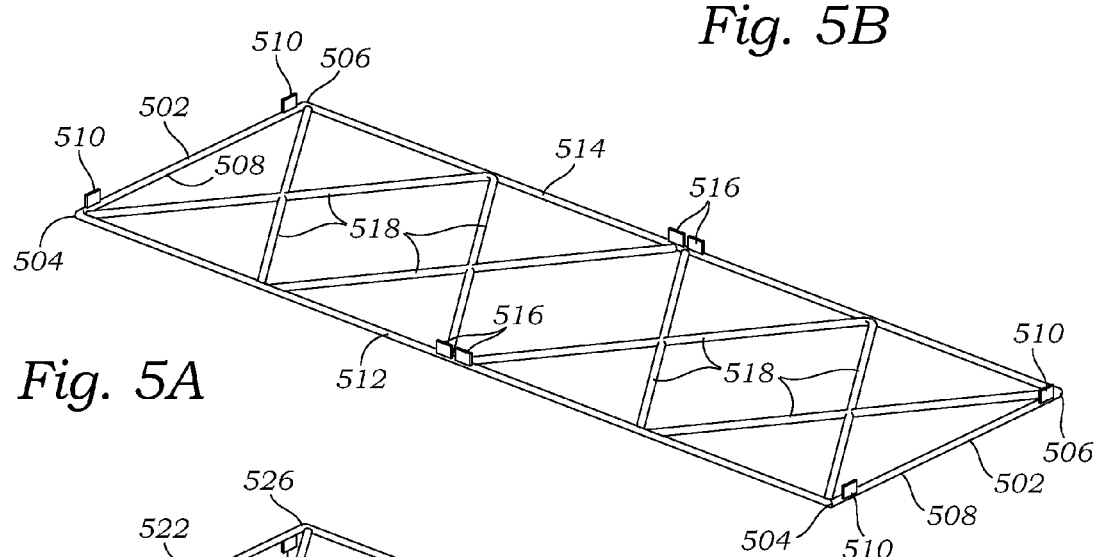
FIG. 5A is a perspective view of the upper frame.

As illustrated in FIGS. 4 and 5A, the upper frame includes frame upper beams 502 connected to the top of the shrouds at the front ends 504 and at the rear ends 506. Beams 502 are preferably directly above axis 324. Other convenient shroud load points 508 may also connected to the beams 502. The upper frame may further includes a front bar 512 between the two beam front ends 504, and a rear bar 514 between the two beam rear ends 506.

FIG. 5B is a detail of the outer truck 510. As illustrated in FIGS. 4 and 5B, the upper frame includes one or more mounted pairs of wheels, or trucks 510, attached above the four beam ends 504 and 506. These trucks 510 transmit the vertical loads from the module to the outer rail 704, as illustrated in FIG. 4. In the embodiment of FIGS. 4, 5A, and 5B, the pivotal mounting system includes the rails and trucks described herein. The pivotal mounting system may also include alternative embodiments known to those skilled in the art.

Figure 5C:
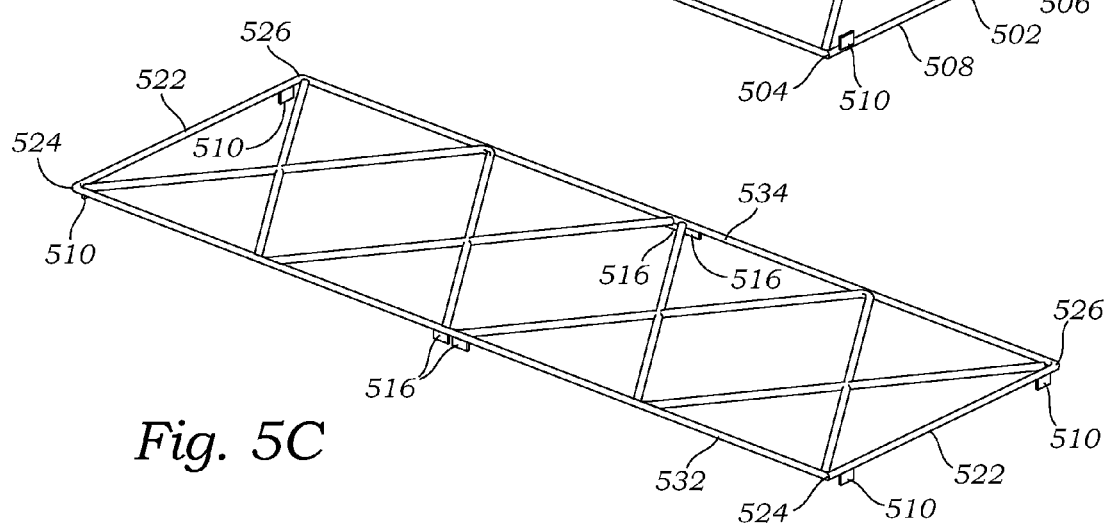
FIG. 5C is a perspective view of the lower frame.

FIG. 5C illustrates one embodiment of the lower frame. In many respects the FIG. 5C lower frame is equivalent to the FIG. 5A upper frame, except it is turned upside-down to be located at the bottom of the FIG. 4 module rather than at the top. The specific differences of FIG. 5C lower frames from FIG. 5A upper frames are as follows: The shrouds of FIG. 3A are connected to the top of the beam ends 524 and beam ends 526 of the beams 522. Trucks 510 are attached to the bottom of the ends 524 and beam ends 526 of beams 522. Trucks 516 are attached to the bottom of the front bar 532 and to the bottom of the rear bar 534. Trucks 510 and trucks 516 are assembled with outer rails 704 and inner rails 706 located below.

Figure 5D:
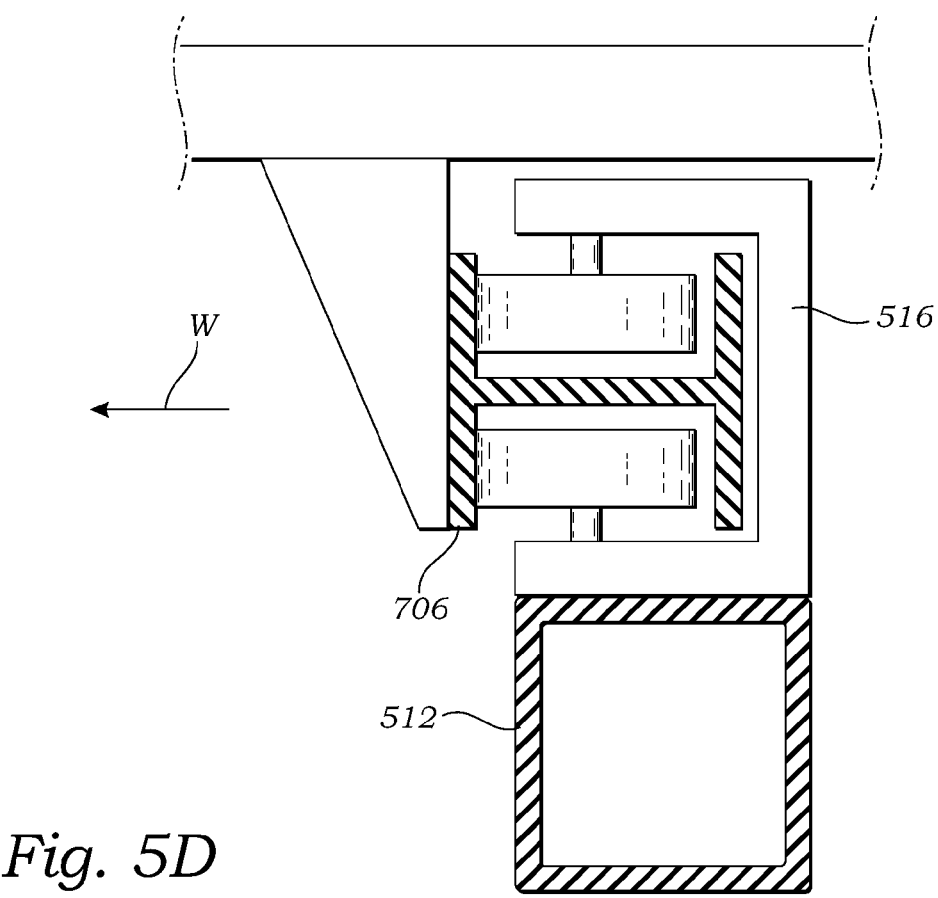
FIG. 5D is a detail of the front inner truck.
Figure 5E:
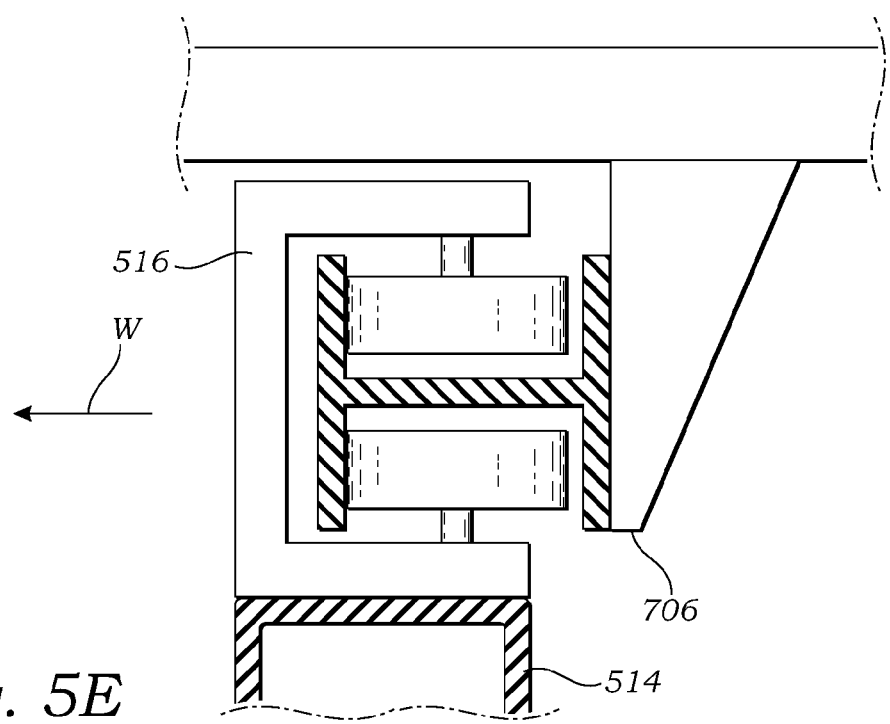
FIG. 5E is a detail of the rear inner truck.

As illustrated in FIG. 4, and FIGS. 5D and 5E, a plurality of trucks 516 are attached to the upper and lower frames for engaging the inner rails 706, for supporting horizontal loads placed upon the shrouds by the wind. FIG. 5D is a detail of the front inner truck. FIG. 5E is a detail of the rear inner truck. The trucks 516 are attached above the front bar 512, and may be centered on its mid-point; and the trucks 516 may also be attached above the rear bar 514, and likewise may be centered on its mid-point. These trucks 516 are positioned to transmit the horizontal load from the upper frame to the inner rail 706 (of FIG. 5E).

As illustrated in FIGS. 5A and 5C, truss members 518 transmit the upper frame horizontal loads from the beam 502 front ends 504 and rear ends 506 to the plurality of trucks 516 (as best illustrated in FIG. 4). These truss members 518 are arranged to provide a stable structure for transmitting the horizontal load from beams 502 to trucks 516. In the present embodiment, the upper frame members 502, 512, 514, and 518, except the trucks 510 and 516, are aligned on one horizontal plane.

Figure 7:
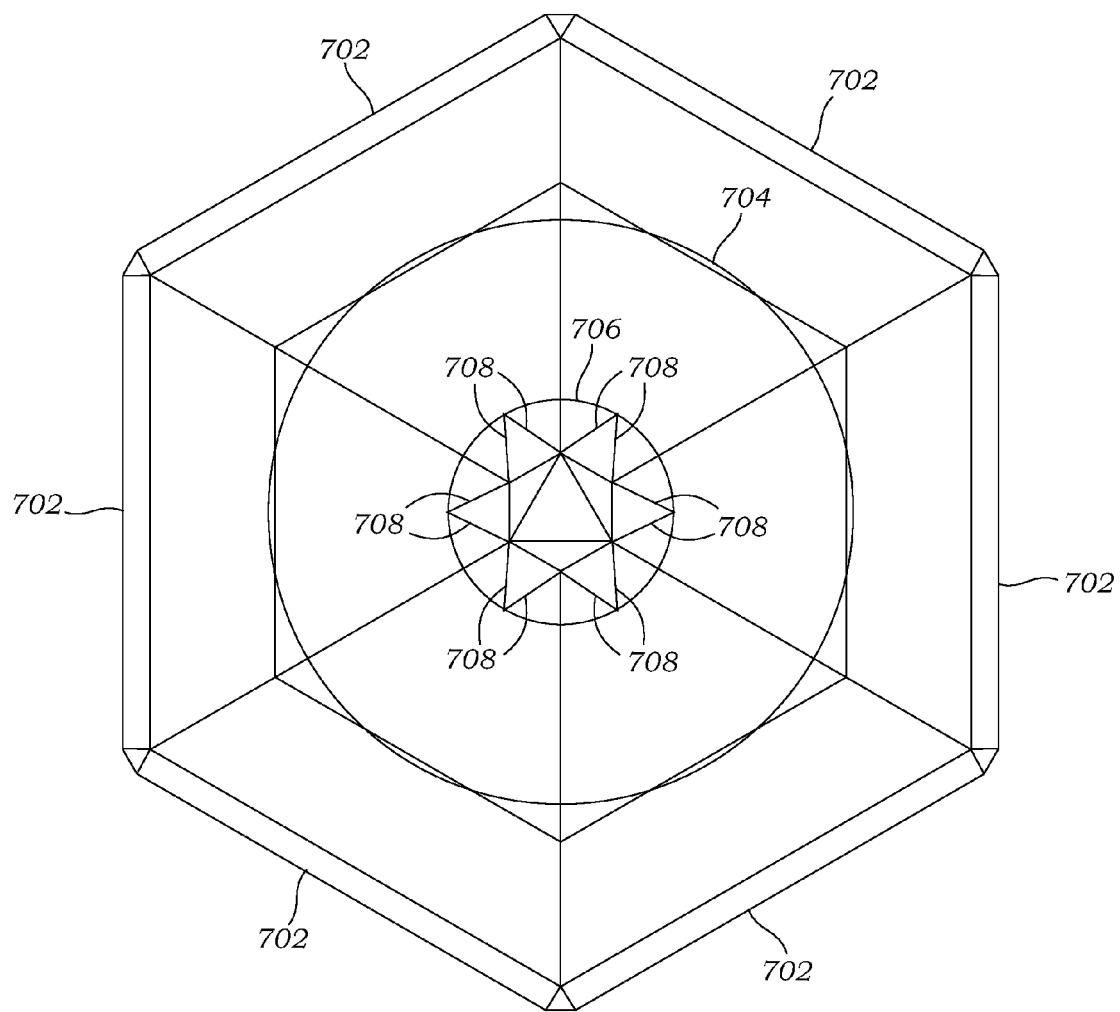
FIG. 7 is a top plan view of the support structure, without the modules.

As illustrated in FIG. 4, trucks 510 and 516 roll on circular rails 704 and 706, respectively, fixed to the structure illustrated in FIG. 7. The trucks 510 and 516, and rails 704 and 706, allow the module of FIG. 4 to rotate around the core tower (illustrated in FIG. 8). The trucks 510 and 516 are part of the frame of FIG. 5A The rails 704 and 706 are part of the structure of FIG. 7. The outer truck of FIG. 5B engages the outer rail 704. The inner trucks 516 engage the inner rails 706 in the front of the modules of FIG. 4. FIG. 5E shows the assembly of the inner trucks 516 with inner rails 706 above and to the rear of the modules of FIG. 4.

The module of FIG. 4 shows module guy pairs 402, which are pairs of cables connecting diagonally between the upper frame of FIG. 5A and the lower frame of FIG. 5C. One module guy pair 402 is located in a vertical plane at the front of the upper frame and the lower frame. Another guy pair 402 is located in a vertical plane at the rear of the upper frame and the lower frame. These module guy pairs 402 provide structural and dimensional stability to each module.

Figure 6:
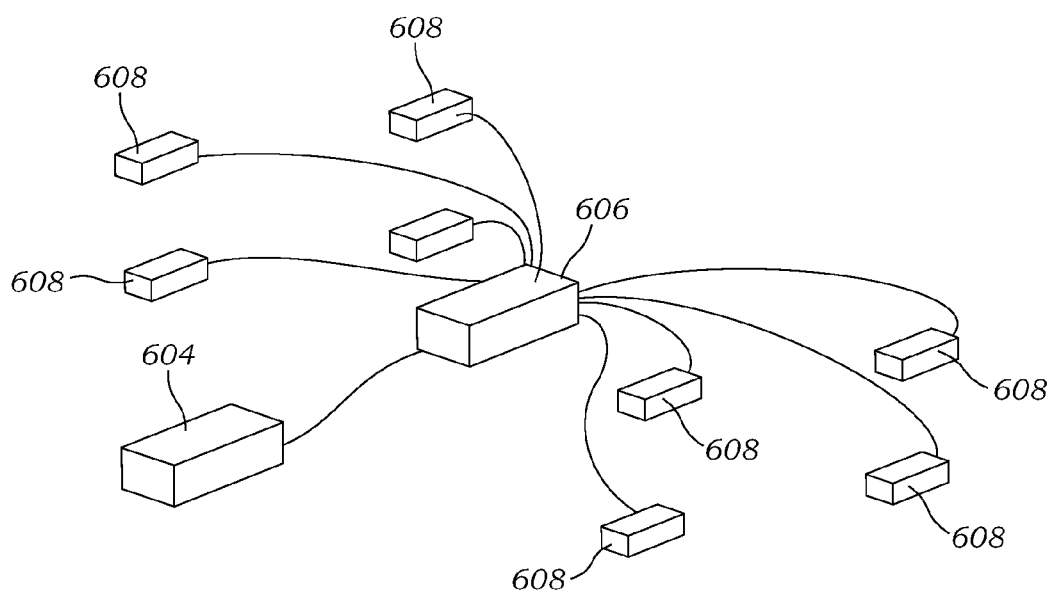
FIG. 6 is a schematic view of the module control system.

FIG. 6 is a schematic drawing of a module control system included in each of the modules of FIG. 4. The module control system includes a wind direction sensing device 604, a module control device 606, and a plurality of electric motors 608 for driving a plurality of outer trucks 510. The module control system is installed in each module to keep it positioned facing the prevailing wind. When the wind direction sensing device 604 senses a change in the direction of the wind, using technology known to those skilled in the art, the module control device 606 uses the electric motors 608 to turn the module in a manner that maintains the module in the correct orientation with respect to the wind.

FIG. 7 shows a top plan view of one embodiment of the support structure. The support structure of this embodiment includes a core tower illustrated in FIG. 8, peripheral towers illustrated in FIG. 9, the truss and rail system described above, and guys 702. In this embodiment there are six peripheral towers; however, this number may vary depending upon the requirements of those skilled in the art (three or greater may be used).

Figure 9:
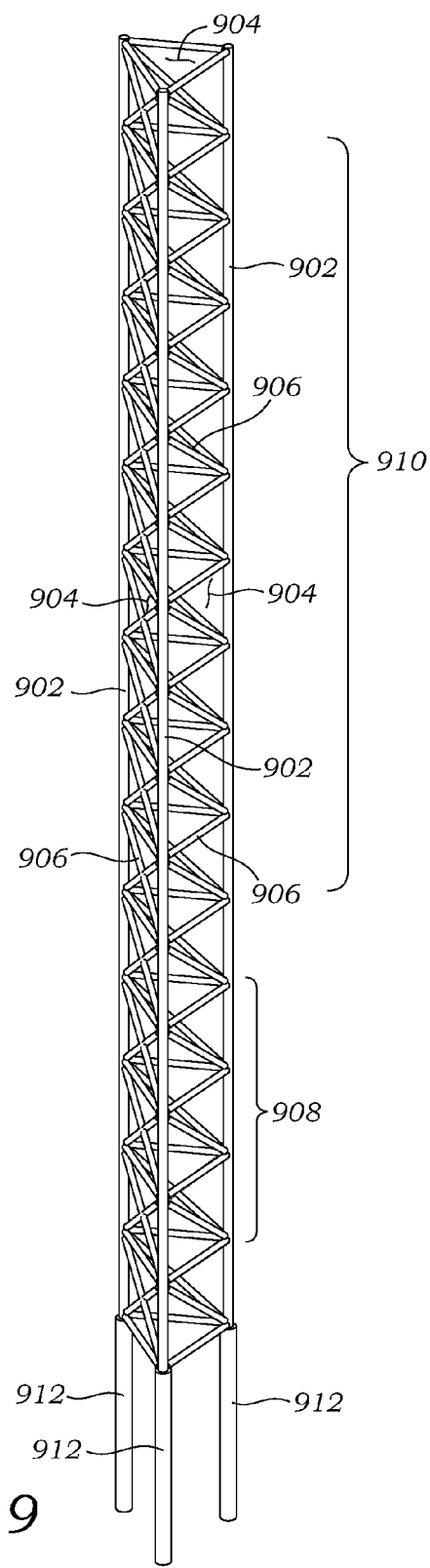
FIG. 9 is a perspective view of the peripheral tower.
Figure 10:
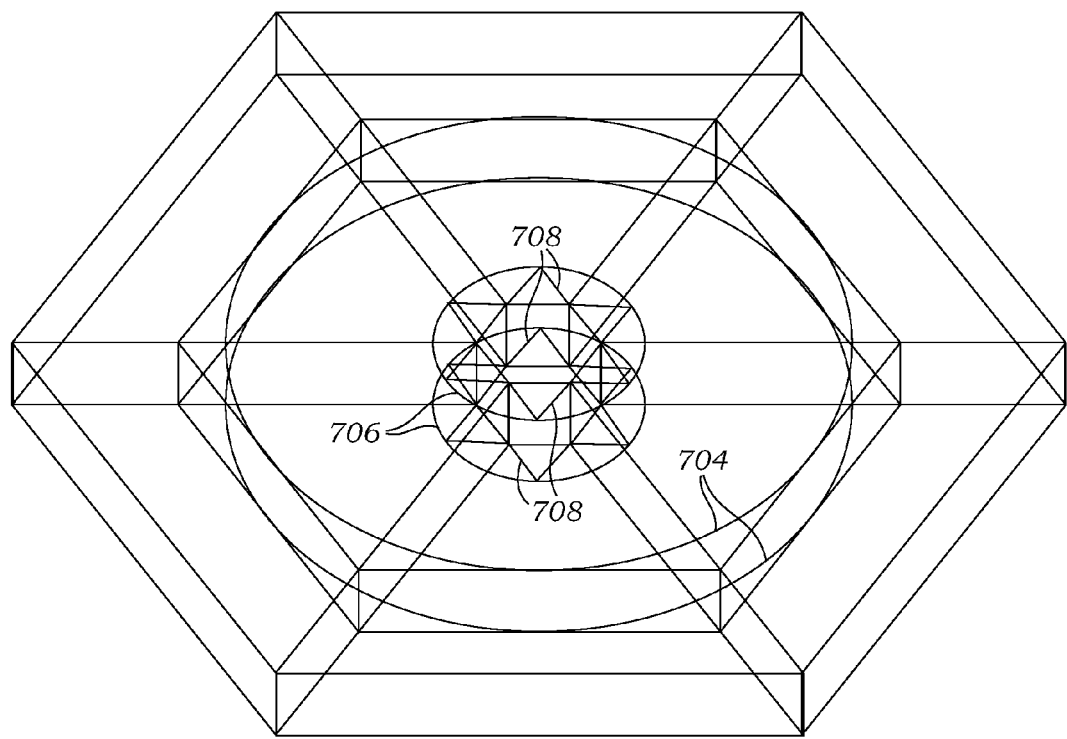
FIG. 10 is a perspective view of the truss and rail system.

As illustrated in FIG. 10, the truss and rail system includes a ring truss (illustrated in FIG. 11), six radial trusses (illustrated in FIG. 12), six peripheral trusses (illustrated in FIG. 13), six rail trusses (illustrated in FIG. 14), one or two outer rails 704, one or two inner rails 706, and 12 or 24 braces 708. The number of FIG. 12 radial trusses, FIG. 13 peripheral trusses, FIG. 14 rail trusses, and braces 708 will change in correlation with the number of FIG. 9 peripheral towers used.

Figure 8:
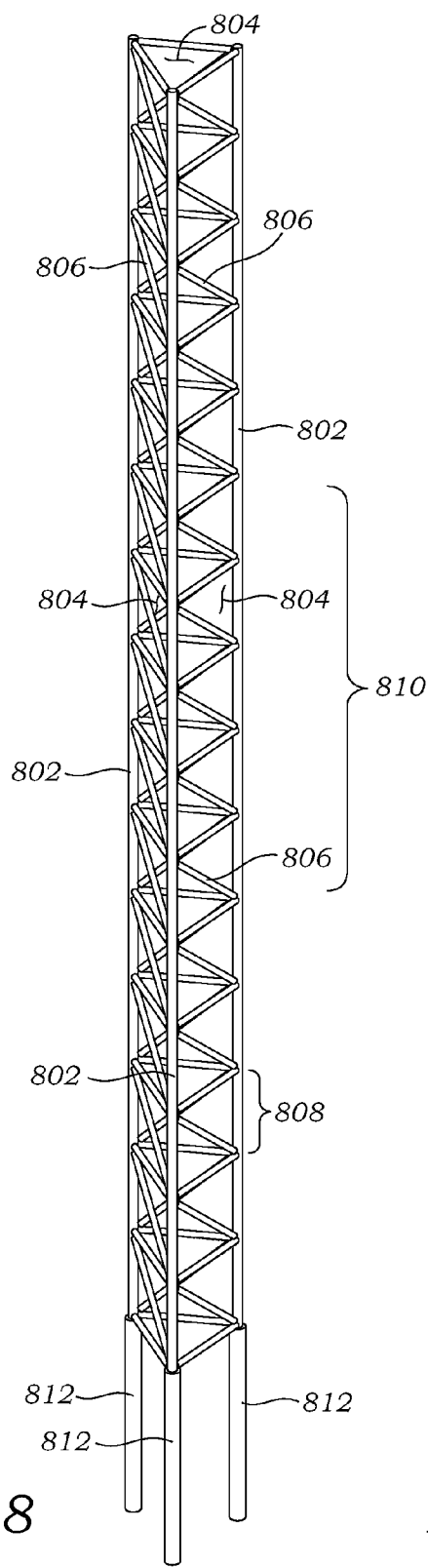
FIG. 8 is a perspective view of the core tower.
Figure 11:
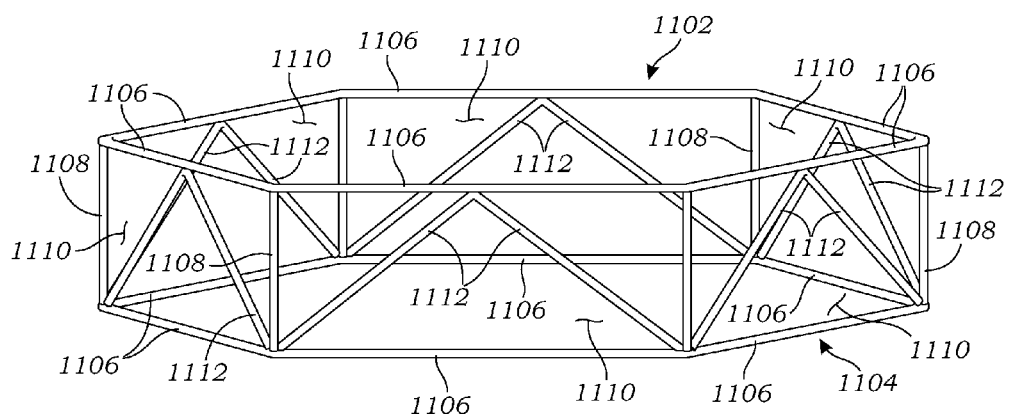
FIG. 11 is a perspective view of the ring truss.

The FIG. 10 truss and rail system connects the FIG. 8 core tower to the FIG. 11 ring truss and connects the FIG. 11 ring truss to the FIG. 9 peripheral towers by means of the FIG. 11 radial truss. The FIG. 10 truss and rail system connects adjacent FIG. 9 peripheral towers to one another by means of the FIG. 12 peripheral trusses. The FIG. 10 truss and rail system connects adjacent FIG. 11 radial trusses to one another by means of the FIG. 13 rail trusses. Each FIG. 10 truss and rail system comprises one or two outer rails 704 and one or two inner rails 706. Outer rails 704 and inner rails 706 are provided as needed to receive vertical and horizontal loads respectively from outer trucks 510 and inner trucks 516 of the FIG. 4 modules. Braces 708 provide supplemental lateral support to inner rails 706 by connecting them to FIG. FIG. 11 ring trusses. FIG. 10 truss and rail systems occur at vertical intervals sufficient to allow the FIG. 4 modules to be supported between them. Individual FIG. 4 modules may be omitted at the discretion of the owner and the space left empty or used for other purposes. The FIG. 10 truss and rail system locations are above, between and below the FIG. 4 modules.

FIG. 8 shows the first embodiment of the core tower. The FIG. 8 core tower has three vertical legs 802 forming an equilateral triangle. The legs 802 are separated by a horizontal distance of 0.433 D identified as a face 804 of the FIG. 8 core tower. The number of legs in the core tower may also be four, and the distance between legs may vary from 0.1 D to 0.7 D. Each of the three faces 804 has a pattern of lacings 806 between the legs 802. This lacing pattern is repeated at intervals, which intervals are the definition of a panel 808 of the FIG. 8 core tower. A sector 810 of the FIG. 8 core tower is defined as enough panels connected into a vertical stack to equal the vertical distance between the centerlines of FIG. 10 truss and rail systems. FIG. 11 ring trusses are attached at the middle of the top panel 808 of each sector 810. The legs 802 of the top panel 808 of each sector 810 are strengthened to support the attached FIG. 11 ring truss. The bottom of each leg 802 is supported by a foundation 812 which may be any configuration appropriate for the soils at a specific site and the loads imposed.

Figure 12:
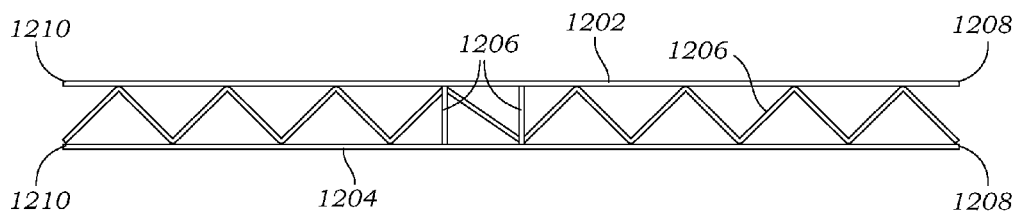
FIG. 12 is an elevation view of the radial truss.

FIG. 9 shows the first embodiment of the peripheral tower. The FIG. 9 peripheral tower has three vertical legs 902 forming an equilateral triangle. FIG. 9 peripheral tower may also be configured to have four legs. One of the legs 902 is oriented toward the center of the FIG. 8. core tower. Legs 902 are separated by a horizontal distance of approximately 0.10 D, which is identified as a face 904 of the FIG. 9 peripheral tower. The face width may vary from 0.05 D to 0.25 D. Each of the three faces 904 has a pattern of lacings 906 between the legs 902. This lacing pattern is repeated a sufficient number of times to equal the panel 808 height of the FIG. 8 core tower. This panel height is the definition of a section 908 of the FIG. 9 peripheral tower. A sector 910 of the FIG. 9 peripheral tower is defined as enough sections 908 connected into a vertical stack to equal the vertical distance between the centerlines of FIG. 10 truss and rail systems. FIG. 12 radial trusses and FIG. 13 peripheral trusses are attached at the middle of the top section 908 of each sector 910. The legs 902 of the top section 908 of each sector 910 are strengthened to support the attached FIG. 12 radial truss and FIG. 13 peripheral trusses. The bottom of each leg 902 is supported by a foundation 912 configured appropriately for the soils at each site and the loads imposed.

FIG. 11 shows the first embodiment of ring truss. FIG. 11 ring trusses include a top ring 1102 and a bottom ring 1104. Each ring 1102 and ring 1104 includes six equal members 1106. If more or less than six FIG. 9 peripheral towers are used, the number of members in the ring 1102 and ring 1104 are modified to match. The lengths of the sides of the FIG. 11 ring truss are sufficient for it to span around FIG. 8 core tower and connect to the FIG. 8 core tower legs 802. The vertical distance between rings 1002 and 1004 is 0.1167 D, but may vary from 0.05 D to 2.5 D. Each corner of the top ring 1102 is connected to the corner of the bottom ring 1104 directly below with a vertical strut 1108. Each portion of the FIG. 11 ring truss between adjacent struts 1108 is defined as a face 1110 of the FIG. 11 ring truss. Each of the faces 1110 has a pattern of lacings 1112 between the adjacent struts 1108 to provide structural stability to the frame. Each FIG. 11 ring truss is positioned around the FIG. 8 core tower so some of its corners align vertically with the legs 802 of the FIG. 8 core tower. These aligned corners are attached to the FIG. 8 core tower at the middle of a top section 808 of each sector 810.

FIG. 12 shows the first embodiment of the radial truss. Each FIG. 12 radial truss length is oriented horizontally. The FIG. 11 radial truss depth is oriented vertically with a top chord 1202 and a bottom chord 1204. The vertical distance between the top chord 1202 and the bottom chord 1204 is 0.1167 D, exactly matching and varying with the FIG. 11 ring truss depth. The full lengths of the top chord 1202 and the bottom chord 1204 are connected with a continuous series of diagonal lacings 1206. The total length of the FIG. 12 radial truss is 1.655 D, but may vary from 1.5 D to 2.5 D. The inner end 1208 of each FIG. 12 radial truss is connected to one vertex of the FIG. 11 ring truss. There are six FIG. 12 radial trusses connected to each FIG. 11 ring truss. The number of FIG. 12 radial trusses will vary to match the number of FIG. 9 peripheral towers. The outer end 1210 of each FIG. 12 radial truss is connected to the inside leg 902 of the FIG. 9 peripheral tower at that location.

Figure 13:
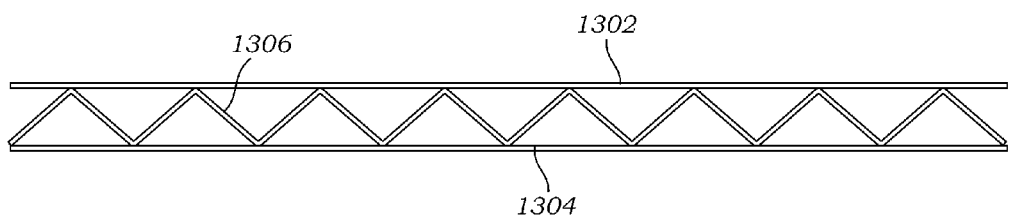
FIG. 13 is an elevation view of the peripheral truss.

FIG. 13 shows the first embodiment of the peripheral truss. Each FIG. 13 peripheral truss length is oriented horizontally. Each FIG. 13 peripheral truss depth is oriented vertically with a top chord 1302 and a bottom chord 1304. The vertical distance between the top chord 1302 and the bottom chord 1304 is 0.1167 D, exactly matching and varying with the FIG. 12 radial truss depth. The full lengths of the top chord 1302 and the bottom chord 1304 are connected with a continuous series of diagonal lacings 1306. The total length of the FIG. 13 peripheral truss is 1.9124 D, but may vary from 1.5 D to 2.5 D. Each end of the FIG. 12 peripheral truss is connected to the inside leg of the FIG. 9 peripheral tower and the FIG. 11 radial truss at that location.

Figure 14:
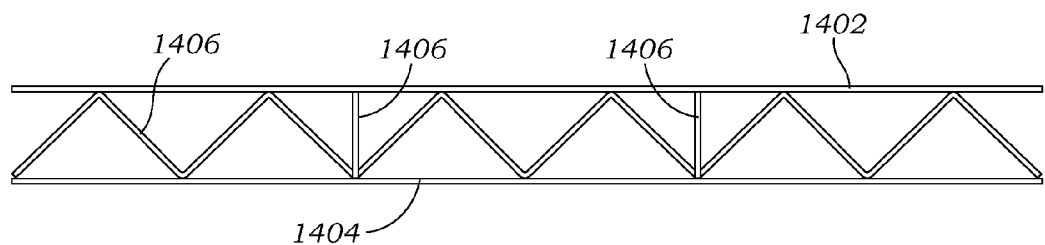
FIG. 14 is an elevation view of the rail truss.

FIG. 14 shows the first embodiment of the rail truss. Each FIG. 14 rail truss is oriented horizontally. The FIG. 14 rail truss depth is oriented vertically with a top chord 1402 and a bottom chord 1404. The vertical distance between the top chord 1402 and the bottom chord 1404 is 0.1167 D, exactly matching and varying with the FIG. 12 radial truss depth. The full lengths of the top chord 1402 and the bottom chord 1404 are connected with a continuous series of diagonal lacings 1406. The total length of the FIG. 14 rail truss is 1.2474 D, but may vary from 1.0 D to 2.0 D. Each end of the FIG. 14 rail truss is connected to a FIG. 12 radial truss.

Figure 15:
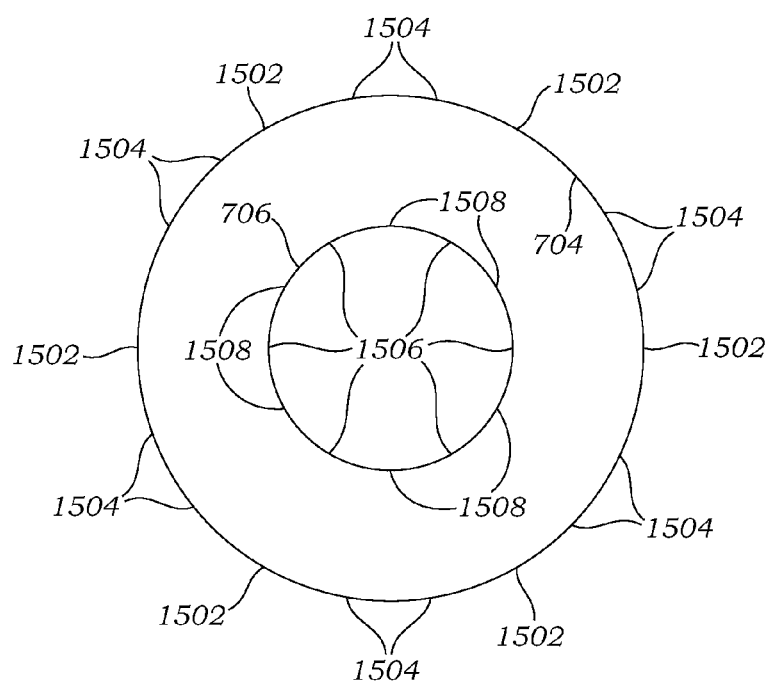
FIG. 15 is a plan view of the rails.

FIG. 15 shows a plan view of the first embodiment of outer rails 704 and inner rails 706. The outer rail 704 has a radius of 1.097 D, which may vary from 0.75 D to 1.5 D. Outer rail 704 is attached at points 1502 to the six FIG. 12 radial trusses at sixty-degree intervals. Outer rail 704 is attached at points 1504 in two places to each of the six FIG. 14 rail trusses between the FIG. 12 radial trusses. The locations of the attachments 1504 to the FIG. 13 rail trusses are spaced so the rail 704 is attached at regular twenty-degree intervals throughout its full circumference. The number of rail 704 attachments 1502 and 1504 and their angular intervals will vary with the number of FIG. 12 radial trusses.

Inner rail 706 has a radius of approximately 0.255 D, which may vary from 0.5 D to 1.5 D. Inner rail 706 is attached at points 1506 to the six FIG. 12 radial trusses at sixty-degree intervals. Inner rail 706 is supported to resist horizontal loads by braces 708 at points 1508 halfway between the FIG. 12 radial trusses. Braces 708 are positioned as shown in FIG. 7B between rails 706 and FIG. 11 ring trusses. The number of rail 706 attachments 1506 and their angular intervals will vary with the number of FIG. 12 radial trusses.

Figure 16:
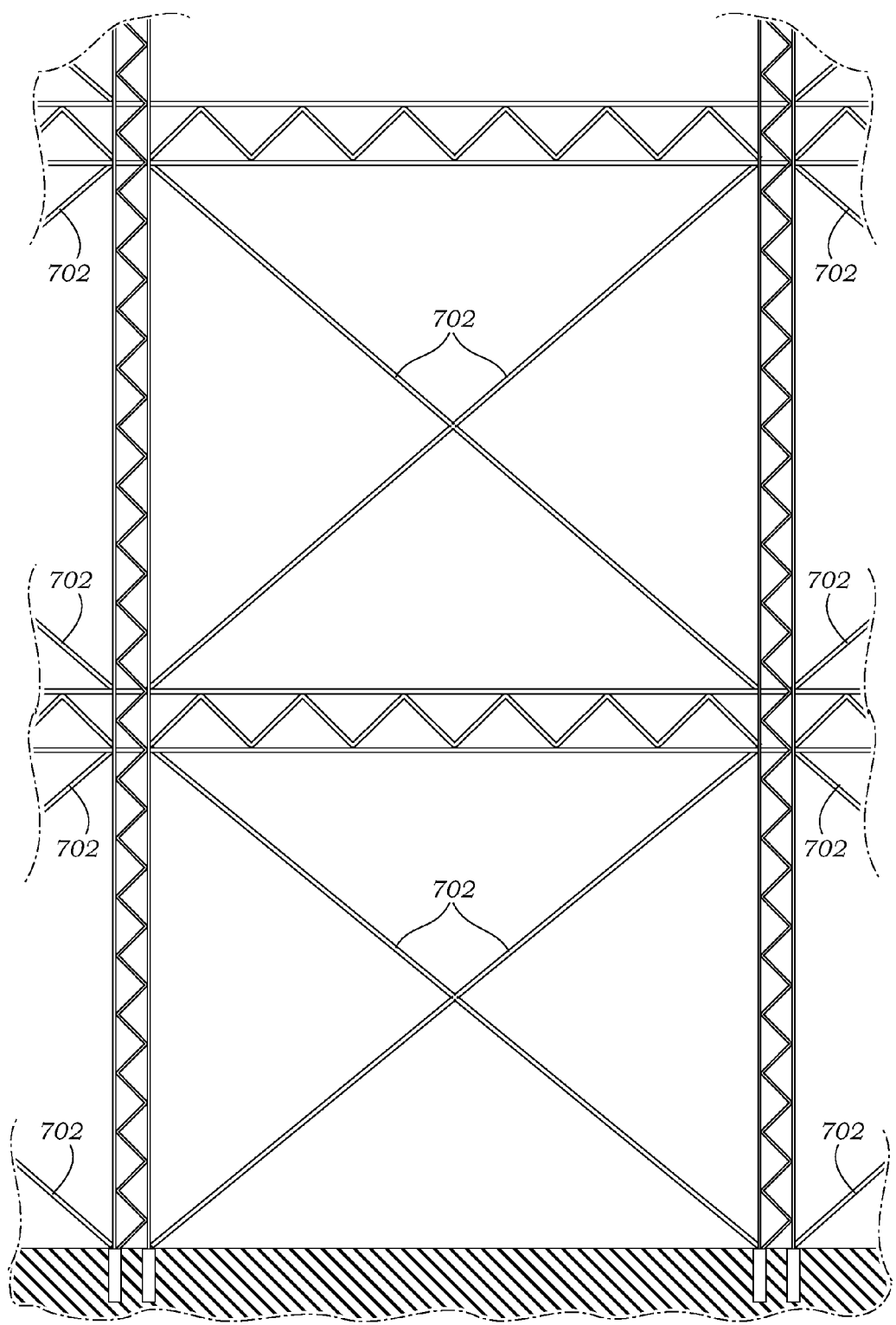
FIG. 16 is an elevation view of guy pairs.

FIG. 16 is a partial elevation view drawing of the outside face of FIG. 7 structure. FIG. 16 shows the configuration of pairs of guys 702. Guys 702 connect diagonally between adjacent FIG. 9 peripheral towers and between adjacent FIG. 10 truss and rail system levels. However, the bottom pair of guys 702 connect between the bottom FIG. 10 truss and rail system and the base of the two adjacent FIG. 9 peripheral towers. Guys 702 provide structural stability to the FIG. 7 structure.

Operation of the First Embodiment

Each FIG. 4 module is continually oriented to face directly into the prevailing wind. The wind entering the front 308 of each FIG. 3A shroud has its velocity increased by approximately 50 percent at the throat 312 by the carefully selected aerodynamic shape of the outer front curve 330 and the inner front curve 336. This increased wind velocity then drives the turbine 204 located at the throat 312 and the related FIG. 2 power system to produce electric energy for human use. Both the FIG. 3A shroud shape and the FIG. 2 power system are selected and optimized to increase the power production as much as possible The wind passing over the FIG. 3A shroud produces drag forces. The total aerodynamic shape of the FIG. 3A shroud is optimized to the extent feasible to reduce these drag forces. This is significant because all structural components of the Wind Power System must provide the strength to resist wind forces as well as support the weight of the System. The cost of this strength affects the commercial feasibility of the System.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A facility for producing electrical energy from a prevailing wind above a surface, the facility comprising:
    a plurality of shrouds, each shroud forming a throat which increases the velocity of the prevailing wind passing through the shroud;
    a plurality of wind turbines, each positioned in the throat of one of the plurality of shrouds;
    a power system for converting mechanical energy from the plurality of wind turbines to electrical energy;
    a plurality of modules, each having at least two of the plurality of shrouds and the associated wind turbines, and at least a portion of the power system;
    a support structure supporting the plurality of modules above the surface; and
    a pivotal mounting system for pivotally supporting each of the plurality of modules so that each of the plurality of modules can rotate as needed to face the prevailing wind, the pivotal mounting system comprising an inner rail and an outer rail above and below each module, each rail being mounted on a truss system of the support structure.

2. The facility of claim 1, wherein each of the plurality of shrouds comprises:
    an inner surface and an outer surface that define an enclosed cavity therebetween;
    structural members within the enclosed cavity providing strength and rigidity to the shroud;
    a plurality of struts supported by the shroud, the struts extending to support the wind turbine within the throat; and
    a platform in the enclosed cavity for supporting components of the power system.

3. The facility of claim 1, wherein the pivotal mounting system further comprises:
    a plurality of trucks mounted on upper and lower frames of the module, each of the plurality of trucks having at least one wheel for mounting the truck to one of the inner or outer rails, wherein some of the wheels engage the outer rails vertically so the weight of the module is supported by the outer rails, and some of the wheels engage the inner rails horizontally, so horizontal forces exerted on the module by prevailing wind are supported by the inner rails.

4. The facility of claim 1, wherein each of the plurality of shrouds has a toroidal shape with a horizontal axis.

5. The facility of claim 4, wherein each of the plurality of shrouds further comprises:
    an inner surface and an outer surface that meet at an annular leading edge and a trailing edge, the annular leading edge having an edge diameter, a half radial cross-section of the inner and outer surfaces forming a shape, and it is rotation of the shape about the horizontal axis of the shroud that defines the inner and outer surfaces;
    a throat formed by the inner surface between the leading and trailing edges and having a throat diameter (D) which is smaller than the edge diameter and which thereby increases the velocity of the wind through the throat relative to the velocity of the prevailing wind;

an inner front curve of the inner surface shaped to maximize the mass and velocity of the wind passing through the throat and to minimize wind turbulence and drag along the inner surface of the shroud, the inner front curve beginning at the annular leading edge, at which point it is a distance 0.55 D to 0.95 D from the shroud axis, extending toward the axis in a direction within fifteen degrees of angle from a plane perpendicular to the axis and terminating at the throat in a direction within fifteen degrees of parallel to the axis; and an outer front curve of the outer surface shaped to maximize the mass of the wind passing through the throat in conjunction with the shape of the inner front curve and being shaped to minimize wind turbulence and drag along the outer surface of the shroud, the outer front curve beginning at the annular leading edge and extending away from the axis in a direction within fifteen degrees of angle from a plane perpendicular to the axis and terminating in a direction within ten degrees of parallel to the axis and at a distance from the axis of 0.6 D to 2.0 D.

6. The facility of claim 1, wherein each of the modules comprises at least two of the shrouds facing in the same direction and connected by a horizontal upper frame above the at least two shrouds, and a horizontal lower frame below the at least two shrouds.

7. The facility of claim 6, wherein each of the modules further comprises:

at least two frame guy pairs connecting diagonally between the upper frame and the lower frame for providing structural and dimensional stability to the module, one of the frame guy pairs being in a vertical plane at the front of the upper frame and the lower frame, and another of the frame guy pairs being in a vertical plane at the rear of the upper frame and the lower frame.

8. The facility of claim 7, wherein each of the modules further comprises a module control system comprising a wind direction sensing device, a module control device, and a plurality of electric motors for driving a plurality of wheels for rotating the module to face the prevailing wind.

9. The facility of claim 1, wherein the power system comprises:

a hydraulic system in each the modules, comprising:
 i. a hydraulic pump operably connected to each of the wind turbines; and
 ii. a power controller for operably directing fluid flow from the hydraulic pump to selected hydraulic motors for converting the fluid flow to mechanical energy;

a direct current electrical system having generators for converting the mechanical energy from the hydraulic motors to direct current electricity;

a module buss combining all the direct current electricity generated by the selected hydraulic motors in the module; and a common direct current buss for collecting the direct current electricity from all the modules.

10. The facility of claim 9, wherein the power system further comprises:

an alternating current electrical converter operably connected to the common direct current buss for converting direct current electricity to alternating current electricity synchronized for delivery to a grid.

11. The facility of claim 1, wherein the support structure comprises:

a core tower; and
at least three peripheral towers positioned around the core tower.

12. The facility of claim 11, wherein the support structure further comprises a plurality of truss systems oriented horizontally above and below each of the modules at vertical intervals allowing the modules to rotate between the truss systems while being simultaneously supported by the truss systems, each of the truss system comprising:

i. a ring truss that forms a multi-sided polygon around the core tower, the ring truss having the same plurality of vertices as the number of peripheral towers, the ring truss being connected to the core tower, and the ring truss supporting one end of each radial truss and one end of a rail brace;
 ii. a plurality of the radial trusses each of which connects between one vertex of the ring truss and the peripheral tower;
 iii. a plurality of peripheral trusses each of which connects between two adjacent the peripheral towers; and
 iv. a plurality of the rail trusses each of which connects between two of the adjacent radial trusses.

13. A facility for producing electrical energy from a prevailing wind above a surface, the facility comprising:

a plurality of shrouds, each shroud forming a throat which increases the velocity of the prevailing wind passing through the shroud;

a plurality of wind turbines, each positioned in the throat of one of the plurality of shrouds;

a power system for converting mechanical energy from the plurality of wind turbines to electrical energy;

a plurality of modules, each having at least two of the plurality of shrouds and the associated wind turbines, and at least a portion of the power system;

a support structure supporting the plurality of modules above the surface;

a pivotal mounting system for pivotally supporting each of the plurality of modules so that each of the plurality of modules can rotate as needed to face the prevailing wind; and wherein each of the modules comprises at least two of the shrouds facing in the same direction and connected by a horizontal upper frame above the at least two shrouds, and a horizontal lower frame below the at least two shrouds, and wherein each of the modules further comprises a module control system comprising a wind direction sensing device, a module control device, and a plurality of electric motors for driving a plurality of wheels for rotating the module to face the prevailing wind.

14. A facility for producing electrical energy from a prevailing wind above a surface, the facility comprising:

a plurality of shrouds, each having:
 a toroidal shape with a horizontal axis;
 an inner surface and an outer surface that meet at an annular leading edge and a trailing edge, the annular leading edge having an edge diameter, a half radial cross-section of the inner and outer surfaces forming a shape, and it is rotation of the shape about the horizontal axis of the shroud that defines the inner and outer surfaces;
 a throat formed by the inner surface between the leading and trailing edges and having a throat diameter (D) which is smaller than the edge diameter and which thereby increases the velocity of the wind through the throat relative to the velocity of the prevailing wind;
 an inner front curve of the inner surface shaped to maximize the mass and velocity of the wind passing through the throat and to minimize wind turbulence and drag along the inner surface of the shroud, the inner front curve beginning at the annular leading edge, at which point it is a distance 0.55 D to 0.95 D from the shroud axis, extending toward the axis in a direction within fifteen degrees of angle from a plane perpendicular to the axis and terminating at the throat in a direction within fifteen degrees of parallel to the axis; and an outer front curve of the outer surface shaped to maximize the mass of the wind passing through the throat in conjunction with the shape of the inner front curve and being shaped to minimize wind turbulence and drag along the outer surface of the shroud, the outer front curve beginning at the annular leading edge and extending away from the axis in a direction within fifteen degrees of angle from a plane perpendicular to the axis and terminating in a direction within ten degrees of parallel to the axis and at a distance from the axis of 0.6 D to 2.0 D;

a plurality of wind turbines, each positioned in the throat of one of the plurality of shrouds;

a power system for converting mechanical energy from the plurality of wind turbines to electrical energy;

a plurality of modules, each having at least two of the plurality of shrouds and frames for connecting the shrouds;

a pivotal mounting system for pivotally supporting each of the plurality of modules so that each of the plurality of modules can rotate as needed to face the prevailing wind; and a support structure supporting the plurality of modules above the surface.

15. A facility for producing electrical energy from a prevailing wind above a surface, the facility comprising:

a plurality of shrouds, each shroud having a throat formed by an inner surface between leading and trailing edges and having a throat diameter which is smaller than an edge diameter of the leading edge and which thereby increases the velocity of the wind through the throat relative to the velocity of the prevailing wind;

a plurality of wind turbines, each positioned in the throat of one of the plurality of shrouds;

a power system for converting mechanical energy from the plurality of wind turbines to electrical energy;

a plurality of modules, each having at least two of the plurality of shrouds and the associated wind turbines, and at least a portion of the power system, and frames for interconnecting the shrouds;

a support structure supporting the plurality of modules above the surface, the support structure comprising a central tower, truss systems, and other structural support elements; and a pivotal mounting system for pivotally supporting each of the plurality of modules so that each of the plurality of modules can rotate as needed to face the prevailing wind, the pivotal mounting system for each of the modules comprising:

an inner rail and an outer rail above and below each module, each rail being mounted on a truss system of the support structure; and a plurality of trucks mounted on upper and lower frames of the module, each of the plurality of trucks having at least one wheel for mounting the truck to one of the inner or outer rails, wherein some of the wheels engage the outer rails vertically so the weight of the module is supported by the outer rails, and some of the wheels engage the inner rails horizontally, so horizontal forces exerted on the module by prevailing wind are supported by the inner rails.

16. The facility of claim 15, wherein the support structure further comprises a plurality of truss systems oriented horizontally above and below each of the modules at vertical intervals allowing the modules to rotate between the truss systems while being simultaneously supported by the truss systems, each the truss system comprising:

i. a ring truss that forms a multi-sided polygon around the core tower, the ring truss having the same plurality of vertices as the number of peripheral towers, the ring truss being connected to the core tower, and the ring truss supporting one end of each radial truss and one end of a rail brace;

ii. a plurality of the radial trusses each of which connects between one vertex of the ring truss and the peripheral tower;

iii. a plurality of peripheral trusses each of which connects between two adjacent the peripheral towers; and iv. a plurality of the rail trusses each of which connects between two of the adjacent radial trusses.

17. The facility of claim 16, wherein the inner rail and the outer rail of the pivotal mounting system are supported by the plurality of truss systems.

\* \* \* \* \*